(12) United States Patent
Bourd et al.

(10) Patent No.: US 9,430,807 B2
(45) Date of Patent: Aug. 30, 2016

(54) EXECUTION MODEL FOR HETEROGENEOUS COMPUTING

(71) Applicant: QUALCOMM Incorporated, San Diego, CA (US)

(72) Inventors: Alexei V. Bourd, San Diego, CA (US); William F. Torzewski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 13/777,663

(22) Filed: Feb. 26, 2013

(65) Prior Publication Data
US 2013/0222399 A1   Aug. 29, 2013

Related U.S. Application Data

(60) Provisional application No. 61/603,771, filed on Feb. 27, 2012.

(51) Int. Cl.
| | | |
|---|---|---|
| *G06T 1/20* | (2006.01) | |
| *G06F 9/45* | (2006.01) | |
| *G06F 9/44* | (2006.01) | |
| *G06F 9/54* | (2006.01) | |

(52) U.S. Cl.
CPC . *G06T 1/20* (2013.01); *G06F 8/45* (2013.01); *G06F 8/457* (2013.01); *G06F 9/4436* (2013.01); *G06F 9/544* (2013.01)

(58) Field of Classification Search
None
See application file for complete search history.

(56) References Cited

U.S. PATENT DOCUMENTS

| | | | |
|---|---|---|---|
| 6,578,197 B1 * | 6/2003 | Peercy et al. | 717/143 |
| 2008/0204468 A1 | 8/2008 | Li et al. | |
| 2011/0022817 A1 | 1/2011 | Gaster et al. | |
| 2011/0043518 A1 * | 2/2011 | Von Borries et al. | 345/419 |
| 2011/0072245 A1 * | 3/2011 | Duluk et al. | 712/220 |
| 2011/0289519 A1 | 11/2011 | Frost | |
| 2012/0291040 A1 | 11/2012 | Breternitz et al. | |
| 2012/0297163 A1 | 11/2012 | Breternitz et al. | |
| 2013/0002689 A1 | 1/2013 | Panneer et al. | |

OTHER PUBLICATIONS

Hagiescu, A., et al., "Automated Architecture-Aware Mapping of Streaming Applications Onto GPUs", IEEE International Parallel & Distributed Processing Symposium (IPDPS), May 16, 2011, pp. 467-478, 12 pp.
International Search Report and Written Opinion—PCT/US2013/028029—ISA/EPO—May 14, 2013, 14 pp.
Jung, H., et al., "Automatic CUDA Code Synthesis Framework for Multicore CPU and GPU Architectures", Parallel Processing and Applied Mathematics, Sep. 11, 2011, pp. 579-588, 10 pp.
Kwon, S., et al., "A Retargetable Parallel-Programming Framework for MPSoC", ACM Transactions on Design Automation of Electronic Systems, vol. 13, No. 3, Jul. 1, 2008, pp. 1-18.
Li, T., et al., "A Static Task Scheduling Framework for Independent Tasks Accelerated Using a Shared Graphics Processing Unit," IEEE 17th International Conference on Parallel and Distributed Systems (ICPADS), Dec. 7, 2011, pp. 88-95, 8 pp.
Zhang, W., "A Scheduling Framework for a Heterogeneous Parallel Architecture", Concordia University, Montreal, Quebec, Canada, Nov. 2011, 102 pp.

\* cited by examiner

*Primary Examiner* — Barry Drennan
*Assistant Examiner* — Diana Hickey
(74) *Attorney, Agent, or Firm* — Shumaker & Sieffert, P.A.

(57) ABSTRACT

The techniques are generally related to implementing a pipeline topology of a data processing algorithm on a graphics processing unit (GPU). A developer may define the pipeline topology in a platform-independent manner. A processor may receive an indication of the pipeline topology and generate instructions that define the platform-dependent manner in which the pipeline topology is to be implemented on the GPU.

20 Claims, 4 Drawing Sheets

EXECUTION MODEL FOR HETEROGENEOUS COMPUTING

This application claims the benefit of U.S. Provisional Application 61/603,771 filed Feb. 27, 2012, the entire content of which is hereby incorporated by reference in its entirety.

TECHNICAL FIELD

This disclosure relates to execution of applications, and more particularly to execution of applications in various processing units.

BACKGROUND

Graphics processing units (GPUs) are being used for purposes in addition to graphics processing. For example, non-graphics related applications may execute with increased speed by exploiting the massive parallelism of a GPU. This has led to GPUs that provide additional non-graphics related processing functionality and are referred to as general purpose GPUs (GPGPUs). For instance, a GPGPU includes one or more shader cores, and the shader cores are configured to execute applications such as graphics related applications, as well as non-graphics related applications.

SUMMARY

In general, this disclosure is related to techniques for generating an execution model for implementing computational pipeline. For instance, many data processing algorithms may be represented as a computational pipeline where one unit of the pipeline receives and processes data, and outputs the processed data for another unit of the pipeline to further process. The techniques described in this disclosure may allow for representing the computational pipeline in such a way that it may be executed efficiently on various types of parallel computing devices, an example of which is a graphics processing unit (GPU). For example, the techniques may represent the computational pipeline in a platform-independent manner (e.g., not dependent upon the computing device that is to implement the computational pipeline).

With the representation of the computational pipeline, the techniques may utilize platform-dependent compilation to generate instructions that are specific for the available computing device, such as the available GPU or even a central processing unit (CPU). For example, the computational pipeline may be defined in a platform-independent manner, and a compiler generates instructions that are specific for the platform on which the computational pipeline is to be implemented.

In one example, the disclosure describes a method for heterogeneous computing. The method includes receiving, with a processor, a pipeline topology of an execution model that defines a data processing algorithm in a platform-independent manner. The method also includes generating, with the processor, instructions that indicate a platform-dependent manner in which the pipeline topology of the execution model is to be implemented on a graphics processing unit (GPU). In this example, the platform-dependent manner in which the pipeline topology of the execution model is to be implemented on the GPU is based on a platform of the GPU. The method also includes transmitting, with the processor, the instructions to the GPU.

In one example, the disclosure describes an apparatus. The apparatus includes a graphics processing unit (GPU) and a processor. The processor is configured to receive an indication of a pipeline topology of an execution model that defines a data processing algorithm in a platform-independent manner. The processor is also configured to generate instructions that indicate a platform-dependent manner in which the pipeline topology of the execution model is to be implemented on the GPU. In this example, the platform-dependent manner in which the pipeline topology of the execution model is to be implemented on the GPU is based on a platform of the GPU. The processor is also configured to transmit the instructions to the GPU.

In one example, the disclosure describes a computer-readable storage medium having instructions stored thereon that when executed by one or more processors cause the one or more processors to receive a pipeline topology of an execution model that defines a data processing algorithm in a platform-independent manner. The instructions also cause the one or more processors to generate instructions that indicate a platform-dependent manner in which the pipeline topology of the execution model is to be implemented on a graphics processing unit (GPU). In this example, the platform-dependent manner in which the pipeline topology of the execution model is to be implemented on the GPU is based on a platform of the GPU. The instructions also cause the one or more processors to transmit the instructions to the GPU.

In one example, the disclosure describes an apparatus. The apparatus includes a graphics processing unit (GPU) and a processor. The processor includes means for receiving a pipeline topology of an execution model that defines a data processing algorithm in a platform-independent manner. The processor also includes means for generating instructions that indicate a platform-dependent manner in which the pipeline topology of the execution model is to be implemented on the GPU. In this example, the platform-dependent manner in which the pipeline topology of the execution model is to be implemented on the GPU is based on a platform of the GPU. The processor also includes means for transmitting the instructions to the GPU.

The details of one or more examples are set forth in the accompanying drawings and the description below. Other features, objects, and advantages will be apparent from the description and drawings, and from the claims.

DETAILED DESCRIPTION

Figure 1:
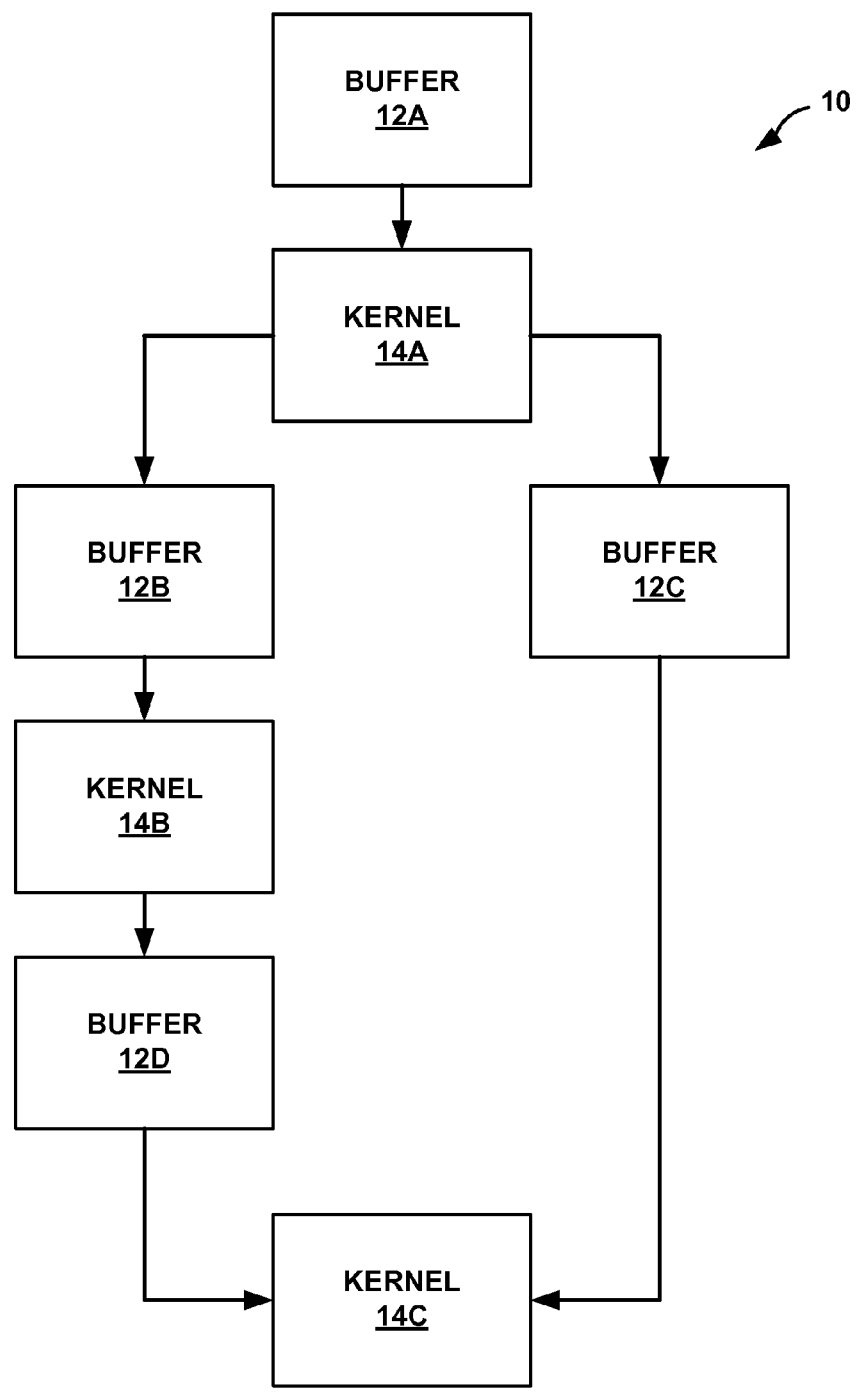
FIG. 1 is a conceptual diagram illustrating an example of an execution model.

A graphics processing unit (GPU) may be configured to quickly and efficiently process data in parallel. Developers may develop data processing algorithms in form of applications that execute on the GPU. For example, a GPU may include a shader processor that is configured to execute one or more applications. Examples of these applications include shader programs such as vertex shaders, hull shaders, fragment shaders, geometry shaders, and other such applications related to graphics processing.

In addition, some application developers may consider it beneficial to exploit the massive parallelism of the GPU and execute non-graphics related applications on the GPU. For example, the processing parallelism provided by a GPU may be suitable to execute parallel matrix operations, even when the matrix operations are unrelated to graphics processing. Other examples of non-graphics related applications include techniques related to fluid dynamics or linear algebra in which quick execution of parallel operations may be beneficial. The non-graphics related applications may also execute on the shader processor.

A GPU that is capable of executing such non-graphics related applications may be considered as a general purpose GPU (GPGPU). For example, when a GPU is executing non-graphics related applications, the GPU is functioning as a GPGPU. Most GPUs may be configured to function as a GPGPU.

For purposes of illustration, this disclosure describes techniques with respect to a GPU functioning as a GPGPU. However, the techniques are not limited to instances where the GPU is functioning as a GPGPU (i.e., executing non-graphics related applications), and the techniques may also apply to instances where the GPU is executing graphics related applications. Moreover, the techniques described in this disclosure may be implemented by any type of a processing unit such as a central processing unit (CPU), an accelerator, or any other custom device. While the techniques are described with respect to a GPU, it should be understood that the techniques are extendable to other types of processing units.

The shader processor within the GPU may include a plurality of shader cores (also referred to as programmable compute units to indicate that these cores can execute instructions for both graphics and non-graphics related applications). Each of the programmable compute units may include a local memory reserved for instructions to be executed by that programmable compute unit, as well as data produced by the execution of the instructions, such as intermediate results produced during the execution of the instructions. The local memory of the programmable compute unit may be inaccessible by other programmable compute units. In some instances, different applications that are to be executed on the GPU may be executed by different programmable compute units.

In the techniques described in this disclosure, graphics related applications are referred to as shaders, and non-graphics related applications are referred to as kernels. For instance, examples of shaders (i.e., graphics related applications) include, but are not limited to, a vertex shader, a fragment shader, and a geometry shader. Examples of kernels (i.e., non-graphics related applications) include applications to perform matrix operations, fluid dynamics, image processing operations, video processing operations, and the like.

Furthermore, the kernels need not necessarily be limited to only applications that are executed by the GPU, and also include fixed-function units (i.e., non-programmable units) of the GPU. For purposes of illustration only, the techniques described in this disclosure are described with respect to the kernels being applications that are executed on the GPU. For example, the techniques are described with respect to non-graphics related applications executing on the shader processor of a GPU so that the GPU functions as a GPGPU.

A kernel may include a plurality of work groups, tasks, or threads (all of which are used synonymously in this disclosure). For example, a thread may be a set of instructions of the kernel that can be independently executed from the other threads of the kernel. In some examples, to execute a kernel, one or more of the programmable compute units may each execute one or more threads of the kernel. For instance, a first programmable compute unit may execute a first thread of the kernel, and a second programmable computer unit may execute a second thread of the same kernel. In some examples, one programmable compute unit may execute one or more threads of one kernel, while another programmable compute unit executes one or more threads of another kernel. In some examples, a combination of the two may be possible (i.e., some programmable compute units are executing different threads of the same kernel, while some other programmable compute units are executing threads of different kernels).

While GPUs provide massive parallelism for processing, developers, such as developers of kernels, may consider it difficult to develop kernels that execute efficiently in a pipeline fashion on various types of GPUs. Executing kernels in a pipeline fashion means executing kernels such that data produced by one kernel is consumed by another kernel. As another example, executing kernels in a pipeline fashion means executing a thread of the kernel that produces data that is to be consumed by another thread of the same kernel. In this disclosure, a thread that produces the data may be referred to as a producer thread and the thread that receives the data may be referred to as a consumer thread.

In some examples, the producer thread and the consumer thread may be threads of the same kernel. In some examples, the producer thread and the consumer thread may be threads of different kernels. In these examples, the kernel that includes the producer thread may be referred to as a producer kernel, and the kernel that includes the consumer thread may be referred to as a consumer kernel.

As one example, to implement a data processing algorithm, such as image processing or video processing, a developer may develop a plurality of kernels, where each kernel implements a portion of the overall algorithm. A first kernel may receive data (e.g., non-graphics related data) to be processed, process the data, and output the data for consumption by a second kernel. The second kernel may receive the data outputted by the first kernel, further process the data, and output the data for consumption by a third kernel, and so forth.

In this example, the first, second, and third kernels may be envisioned as forming a pipeline, whereby a first kernel (e.g., a producer kernel) produces data to be consumed by a second kernel (e.g., a consumer kernel from the perspective of the first kernel). The second kernel produces data to be consumed by the third kernel. In this example, the second kernel is a producer kernel from the perspective of the third kernel, and the third kernel is a consumer kernel. In this manner, the GPU may execute the first, second, and third kernels in a pipeline fashion.

In some examples, executing kernels in the pipeline fashion may mean executing the kernels sequentially (e.g., executing the first kernel, followed by executing the second kernel, followed by executing the third kernel, and so forth). However, the techniques described in this disclosure are not so limited. In some examples, executing kernels in the pipeline fashion may mean executing kernels in parallel (e.g., at the same time or overlapping in time). For example, the GPU may execute two or more of the first, second, and third kernels at the same time even if the second kernel is a consumer kernel for the first kernel, and the third kernel is a consumer kernel for the second kernel.

Although the developer may be able to develop kernels that execute in a pipeline fashion to implement a data processing algorithm, the developer may not be able to ensure optimal execution of the kernels across various types of GPUs. For example, the developer may write instructions that execute on a processor. These instructions cause the processor to instruct the GPU when to execute the kernels. As described above, the kernels may execute on one or more compute units; however, the developer may be unaware of the number of compute units available on a particular GPU, or more generally, the parallel processing capabilities of the particular GPU.

In this case, the developer may not be able to predetermine when kernels should execute because the processing capabilities of the GPU is unknown to the developer. This may lead the developer to write different instructions that are each specify to different types of GPUs. For example, the developer may write a first set of instructions, which execute on the processor, that are specific to a first GPU type. For instance, if the first GPU type included three compute units, the first set of instructions may define the manner in which the kernels are to be executed on a GPU with three compute units. The developer may also write a second set of instructions, which execute on the processor, that are specific to a second GPU type. For instance, if the second GPU type included four compute units, the second set of instructions may define the manner in which the kernels are to be executed on a GPU with four compute units.

In some examples, rather than writing instructions for different GPU types, the developer may write instructions for only one type of GPU (e.g., a presumed worst case scenario GPU). In these examples, only one type of GPU may be able to efficiently implement the data processing algorithm, and other GPU types may not efficiently implement the data processing algorithm.

In other words, there may not be a platform-independent manner in which the developer can write instructions that cause the kernels to execute in an efficient manner on the GPU. Rather, the developer may write generic instructions (e.g., that are not dependent on the GPU type) that execute inefficiently on other GPU types. Otherwise, the developer may write platform-dependent instructions which results in non-portable instructions. For example, the developer may have to write separate instructions for each of the different GPU types, which may be overly cumbersome.

The techniques described in this disclosure allow for efficiently executing kernels to implement a data processing algorithm in a platform-independent manner (i.e., for heterogeneous computing). In the techniques described in this disclosure, heterogeneous computing refers to computing in platform-independent manner. As described in more detail, in accordance with the techniques described in this disclosure, the developer specifies a pipeline execution model for the kernels for implementing the data processing algorithm.

To specify the pipeline execution model, the developer may define a topology of the pipeline. The topology of the pipeline may be considered as an execution graph that includes interconnected kernels and buffers. For example, if a first kernel is to produce data that is to be consumed by a second kernel. The developer may define the topology such that the first kernel is coupled to a buffer, such as a first-in-first-out (FIFO) buffer, and the buffer is coupled to the second kernel. In this example, the execution graph may indicate that the first kernel is to output data to the buffer, and the second kernel is to receive the data from the buffer.

In addition to defining the topology, the developer may also define characteristics of the topology as part of the execution model. As one example, the developer may define the amplification factor for each kernel. The amplification factor may indicate the maximum amount of data the kernel will produce for a given amount of data that the kernel will receive. For instance, if the amplification factor is five for a kernel, and the kernel receives two packets of data, then the maximum amount of data the kernel will produce is ten packets of data.

As another example, the developer may define the size of the buffers. For example, the developer may define the width of the buffer (e.g., the amount of data that can be stored within a storage location of the buffer) and the length of the buffer (e.g., the number of storage locations within the buffer).

In this manner, the developer may define a platform-independent execution model for the data processing algorithm. For example, the developer may not need to account for the specific GPU upon which the data processing algorithm will be implemented. Rather, the execution model for each GPU type may be the same.

The techniques described in this disclosure may allow for the developer to define the execution model in a bounded manner. For example, the developer may fully define which kernels are needed, and which kernels form as producer kernels and which kernels form as consumer kernels. Defining the execution model in a bounded manner may be considered as defining a static execution model (e.g., one that is defined prior to the execution).

Defining the execution model in a bounded manner may allow for gains in computational efficiency as compared to defining the execution model in an unbounded manner. In an unbounded definition of the execution model, the developer may not define, prior to execution, the number of kernels that will be needed, or which kernels will be producer kernels and which kernels will be consumer kernels (i.e., not define the interconnection between the kernels). This may result in suboptimal performance of the unbounded execution model, as compared the bounded execution model.

For instance, in the techniques described in this disclosure, the processor may receive the execution model and may compile the execution model into object code (i.e., binary code) that can be processed by the GPU. The compilation step may be a platform-dependent step. For instance, the processor may be preconfigured with information indicating the processing capabilities of the GPU upon which the data processing algorithm is to be implemented. As one example, the processor may be preconfigured with information indicating the number of compute units within the GPU.

In the compilation step, the processor may generate instructions for a meta-scheduler. The meta-scheduler may be software that executes on the GPU or may be hardware within the GPU. The instructions for the meta-scheduler may define the manner in which the execution model is to be executed. In this example, because the execution model may be bounded (e.g., the number of kernels and interconnection of kernels is known) and the processor may be preconfigured with information indicating the processing capabilities of the GPU, the compiler may be able to define instructions for the meta-scheduler that optimize the manner in which the GPU implements the execution model. For unbounded execution models, the number of kernels and their respective interconnections may not be known, and the compiler may not be able to properly optimize the execution of the execution model on the GPU.

FIG. 1 is a conceptual diagram illustrating an example of an execution model. For example, FIG. 1 illustrates execution model 10. A developer may define execution model 10 to implement a data processing algorithm. For example, the developer may define execution model 10 to implement image processing, video processing, linear algebra operations, or an algorithm to compute fluid dynamics. In general, the developer may define execution model 10 to implement any data processing algorithm that exploits the massive parallel computational efficiencies provided by graphics processing units (GPUs), including for non-graphics related purposes. In examples where the GPU is implementing non-graphics related algorithms, the GPU may be considered as functioning like a general purpose GPU (GPGPU).

As illustrated, execution model 10 includes buffers 12A-12D and kernels 14A-14C. In some examples, there may be more or fewer buffers and kernels than those illustrated in FIG. 1. Examples of buffers 12A-12D include, but are not limited to, first-in-first-out (FIFO) buffers and ring buffers.

Examples of kernels 14A-14C include applications developed by the developer that implement at least a portion of the overall data processing algorithm that execution model 10 is defined to implement. The developer may utilize any programming language to develop kernels 14A-14C.

There may be various ways in which the developer may define execution model 10. As one example, the developer may define the execution model on a computing device such as a desktop computer or a laptop computer. The developer may execute an application on the computing device that presents a graphical user interface (GUI). The developer may utilize the GUI to interconnect buffers 12A-12D and kernels 14A-14C in the manner illustrated in FIG. 1. In addition, the developer may utilize the GUI to define characteristics of buffers 12A-12D and kernels 14A-14D.

As another example, the developer may define the execution model utilizing commands in accordance with a particular application processing interface (API). Examples of such APIs include the DirectX® API by Microsoft®, the OpenGL® by the Khronos group, and the OpenCL® by the Khronos group; however, aspects of this disclosure are not limited to the DirectX, the OpenGL, or the OpenCL APIs, and may be extended to other types of APIs that have been developed, are currently being developed, or are to be developed in the future. Moreover, the techniques described in this disclosure are not required to function in accordance with an API.

For example, the commands may include commands that indicate that the developer is defining an execution model. The commands may also include commands that allow the developer to define that buffers 12A-12D and kernels 14A-14C belong to execution model 10 and that define the manner in which buffers 12A-12D and kernels 14A-14C are interconnected.

In either example (i.e., GUI based or command based), the computing device upon which the developer defined execution model 10 may convert execution model 10 include a command list that specifies the topology of execution model 10. For example, as illustrated, kernel 14A receives data from buffer 12A, processes the data, and stores the data in buffers 12B and 12C. Kernel 14B receives data from buffer 12B, processes the data, and stores the data in buffer 12D. Kernel 14C receives data from buffers 12D and 12C and processes the data.

In this manner, buffers 12A-12D and kernels 14A-14C are configured as a computational pipeline. For instance, kernel 14A is a producer kernel for kernels 14B and 14C. Kernel 14B is a consumer kernel for kernel 14A and a producer kernel for kernel 14C. Kernel 14C is a consumer kernel for both kernels 14A and 14B.

To assist with understanding, FIG. 1 may be considered as illustrating the pipeline topology of execution model 10. For instance, the developer may be considered as defining an execution graph that defines the pipeline topology of execution model 10. In this execution graph, kernels 14A-14C may be considered as nodes that are interconnected with buffers 12A-12D.

In some examples, the developer may also interconnect different execution models. For example, rather than defining one execution model for the data processing algorithm, the developer may develop a plurality of execution models, where each execution model implements a portion of the data processing algorithm. In these examples, the kernels within each of the execution models may implement a sub-portion of the portion of the overall data processing algorithm. The developer may interconnect the execution models in a manner similar to interconnecting kernels 14A-14C and buffers 12A-12D. For instance, the developer may interconnect buffer 12A to another execution model and/or interconnect kernel 14C to another execution model.

It may be beneficial to define a plurality of execution models. As described in more detail, a processor may compile an execution model, such as execution model 10, into object code and store the resulting object code. In examples where execution model 10 is one of the plurality of execution models, the processor may not need to recompile execution model 10. In other words, the execution models may be considered as building blocks for an overall data processing algorithm or may define the entirety of the data processing algorithm. Commonly used execution models need not then be recompiled for every instance where the execution model is used.

In addition to defining the topology of execution model 10, the developer may also define characteristics of buffers 12A-12D and kernels 14A-14C. The developer may define the characteristics using the GUI or command based format described above. The developer may define the number of storage locations within buffers 12A-12D (i.e., the length of buffers 12A-12D). The developer may also define the amount of data that can be stored within each storage location of buffers 12A-12D (i.e., the width of buffers 12A-12D).

In some examples, the developer may define the dimensions of buffers 12A-12D. For instance, some image processing techniques, such as convolution, occur on blocks of pixels (e.g., a 7×7 block of pixels). In these examples, it may be beneficial for buffers 12A-12D to be two-dimensional buffers to store pixels in a block form. For instance, if the block of pixels is a 7×7 block of pixels, one or more of buffers 12A-12D may be configured with 7×7 storage locations (i.e., as a two dimensional buffer), rather than a linear buffer with 49 storage locations.

For kernels 14A-14C, the developer may define the amplification factor, as one example. The amplification factor may indicate the maximum amount of data that a kernel produces for a given amount of data the kernel consumes. For example, if the amplification factor for kernel 14B is two, and kernel 14B receives five packets of data from buffer 12B, then the maximum amount of data that kernel 14B will produce is ten packets of data. As another example, for one or more of kernels 14A-14C, the developer may also define the maximum amount of data that the kernels will ever produce (e.g., independent of the amount of data received).

As yet another example, the developer may assign relative importance to kernels 14A-14C. For instance, the importance may indicate which ones of kernels 14A-14C should execute uninterrupted such that more important ones of kernels 14A-14C execute uninterrupted, while less important ones of kernels 14A-14C may execute uninterrupted or interrupted (i.e., the execution is paused intermittently to free for other executions).

The characteristics of kernels 14A-14C and buffers 12A-12D are described for purposes of illustration and should not be considered limiting. It may not be necessary for the developer to define all of example characteristics described above. For example, it may be possible for the developer to define the size (e.g., length and width) of buffers 12A-12D, and not define any characteristics of kernels 14A-14C. In these examples, the amount of data that kernels 14A-14C produce or consume may be immaterial since the size of buffers 12A-12D is already defined. As another example, the developer may define the amplification factor or the maximum amount of data that kernels 14A-14C produce, and not define any characteristics of buffers 12A-12D. In these examples, the processor that compiles execution model 10 may be able to determine the size of buffers 12A-12D based on the amplification factor and/or the maximum amount of data that kernels 14A-14C produce. Also, in these examples, the processor that compiles execution model 10 may be able to determine whether buffers 12A-12D should be one dimensional (i.e., linear) buffers or multi-dimensional buffers.

In general, the developer or the processor may determine the characteristics of kernels 14A-14C and buffers 12A-12D to avoid a "deadlock" situation, while ensuring that buffers 12A-12D are not too large. A deadlock situation may occur when a consumer kernel expects data that is not stored in the buffer from which it is to receive data or when a buffer overflows with data because the producer kernel is storing data faster than the consumer kernel is consuming the data. In a deadlock situation, the kernels may "hang" and stop the implementation of the data processing algorithm unless additional steps are taken to ensure that the kernels do not hang in a deadlock situation. In some instances, it may be better to define the characteristics of kernels 14A-14C and buffers 12A-12D such that deadlock does not occur, rather than configuring the GPU to implement additional tasks to avoid hanging when deadlock occurs.

It may be possible for the developer or the processor to define relatively large sized buffers 12A-12D to mitigate against deadlock. However, if the size of buffers 12A-12D is unnecessarily large, the processor may reserve far more memory space for buffers 12A-12D than needed, which may result in inefficient memory usage.

Accordingly, by defining characteristics of buffers 12A-12D and/or kernels 14A-14D, the developer may be able to define execution model 10 such that the chances of deadlock are diminished, while memory is used efficiently. In this manner, the developer may define a fully bounded, static execution model 10. For example, the developer may define, prior to implementation, the number of kernels 14A-14C and buffers 12A-12D needed to implement execution model 10, as well as characteristics of buffers 12A-12D and/or kernels 14A-14C, rather than the number of kernels and buffers needed to implement execution model 10 being defined dynamically (i.e., during implementation).

The developer may store execution model 10 on a device that includes the GPU that implements the data processing algorithm. For instance, the developer may store the command list that specifies the pipeline topology of execution model 10 on the device that includes the GPU. In some examples, rather than the developer storing execution model 10 on the device, the user of the device may download execution model 10 for storage on the device. In general, the manner in which the device, which includes the GPU that implements the data processing algorithm, stores execution model 10 may not be a constraint on the techniques described in this disclosure. In other words, any technique may be utilized to store execution model 10 (e.g., the list of commands of execution model 10) on the device that includes the GPU upon which the data processing algorithm is to be implemented. For instance, it may even be possible that the computing device on which the developer defined execution model 10 is the same computing device that includes the GPU that is to implement the data processing algorithm.

As described in more detail, the device that includes the GPU may also include a processor. The processor may receive execution model 10 and compile execution model 10 into object code that the GPU is to execute to implement the data processing algorithm defined by execution model 10. In accordance with the techniques described in this disclosure, the processor may compile execution model 10 accounting for the processing capabilities of the GPU.

Accordingly, the developer may define a pipeline topology of execution model 10 in a platform independent manner (i.e., without consideration for the type of GPU that will implement the data processing algorithm). The processor of the device that includes the GPU may generate instructions based on execution model 10 that defines the manner in which the GPU is to implement execution model 10. For example, the processor may compile execution model 10, and generate instructions as part of the compilation. During the compilation of execution model 10, the processor may account for the processing capabilities of the GPU. In this way, the processor may optimize execution model 10 for implementation on the GPU. This may allow the developer to develop execution model 10 as a flexible and easy to understand way that results in highly portable execution models (i.e., models that can be efficiently implemented on different types of GPUs for heterogeneous computing). The developer may not need to concern himself or herself in the platform-specific or implementation-defined behavior of the GPU.

Furthermore, defining execution model 10 in a bounded manner may allow for certain built-in debugging of execution model 10. As one example, defining execution model 10 may reduce the chances of deadlock, as described above. Moreover, for unbounded execution models, it may be possible for a developer to define a first kernel to output data to be consumed by the second kernel, and inadvertently define the second kernel to cause the first kernel to execute, during implementation, such that the first kernel consumes the data produced by the second kernel. This, in effect, creates an infinite loop. For unbounded execution models, there may be no way of determining such a situation exists until implementation.

However, with the bounded execution model 10, the developer may be able to easily avoid creating such infinite loops. For instance, the developer may be able to view on the GUI that he or she created such an infinite loop. As another example, when the application converts the pipeline topology of execution model 10 into the command list of execution model 10, the application may be able to determine whether there are any such infinite loops.

Figure 2:
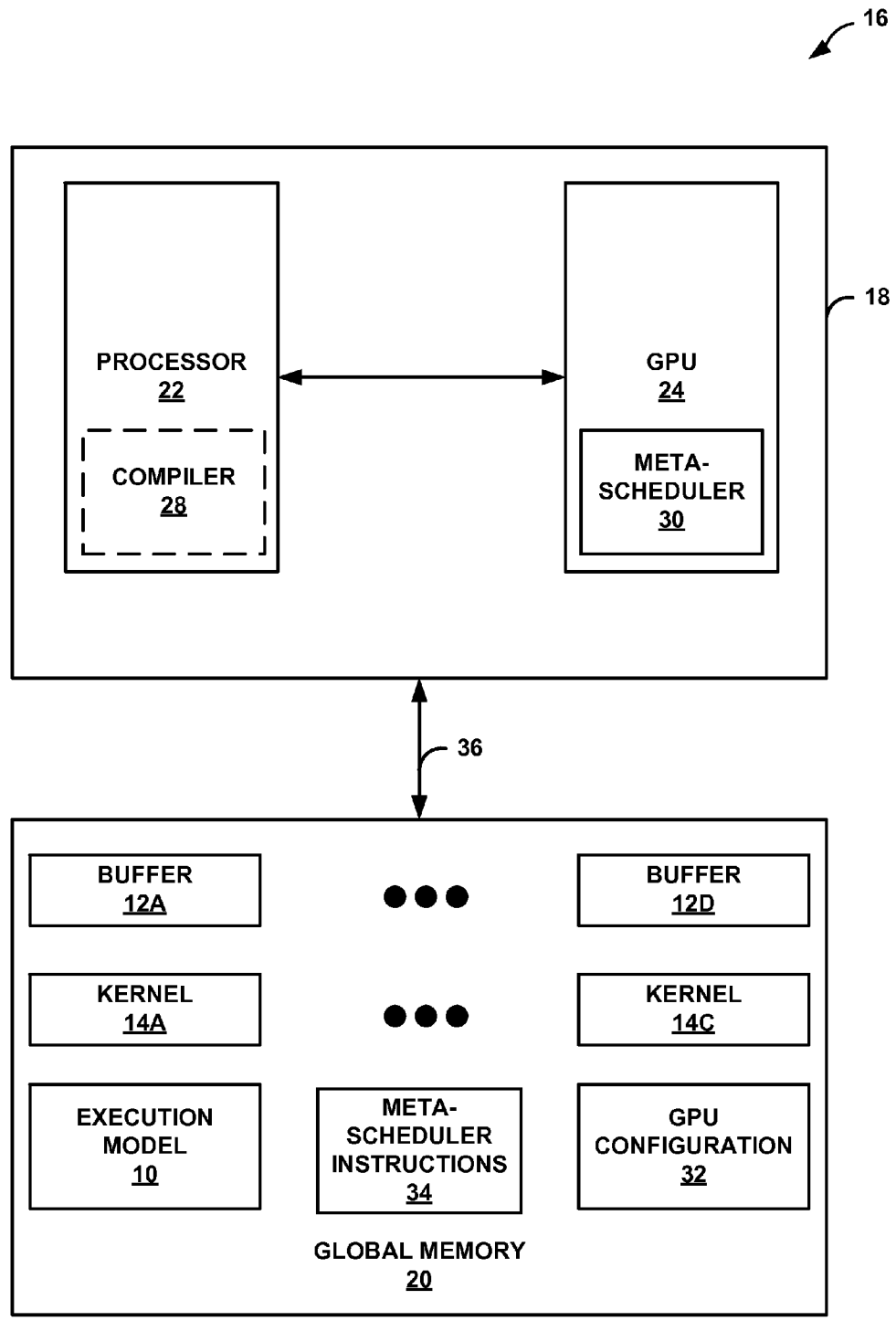
FIG. 2 is a block diagram illustrating an example of a device in accordance with one or more examples described in this disclosure.

FIG. 2 is a block diagram illustrating an example of a device in accordance with one or more examples described in this disclosure. For instance, FIG. 2 illustrates device 16. Examples of device 16 include, but are not limited to, video devices such as media players, set-top boxes, wireless handsets such as mobile telephones, personal digital assistants (PDAs), desktop computers, laptop computers, gaming consoles, video conferencing units, tablet computing devices, and the like. Device 16 may include components in addition to those illustrated in FIG. 2.

As illustrated, device 16 includes integrated circuit (IC) 18 and global memory 20. Global memory 20 may be considered as the memory for device 16. For example, global memory 20 may be external to IC 18 and IC 18 and global memory 20 may communicate via system bus 36. Global memory 20 may comprise one or more computer-readable storage media. Examples of global memory 20 include, but are not limited to, a random access memory (RAM), or any other medium that can be used to carry or store desired program code in the form of instructions and/or data structures and that can be accessed by a computer or a processor.

In some aspects, global memory 20 may include instructions that cause processor 22 and/or graphics processing unit (GPU) 24 to perform the functions ascribed to processor 22 and GPU 24 in this disclosure. Accordingly, global memory 20 may be a computer-readable storage medium having instructions stored thereon that, when executed, cause one or more processors (e.g., processor 22 and GPU 24) to perform various functions.

Global memory 20 may, in some examples, be considered as a non-transitory storage medium. The term "non-transitory" may indicate that the storage medium is not embodied in a carrier wave or a propagated signal. However, the term "non-transitory" should not be interpreted to mean that global memory 20 is non-movable or that its contents are static. As one example, global memory 20 may be removed from device 16, and moved to another device. As another example, a global memory, substantially similar to global memory 20, may be inserted into device 16. In certain examples, a non-transitory storage medium may store data that can, over time, change (e.g., in RAM).

IC 18 includes processor 22 and graphics processing unit (GPU) 24. IC 18 may include additional components, such as interface units to communicate with global memory 20, units to manage memory within global memory 20, and other processing units such as a display processor. IC 18 may be any type of an integrated circuit that houses or forms processor 22 and GPU 24. For example, IC 18 may be considered as a processing chip within a chip package.

Although processor 22 and GPU 24 are illustrated as being part of a single IC 18, aspects of this disclosure are not so limited. In some examples, processor 22 and GPU 24 may be housed in different integrated circuits (i.e., different chip packages).

Examples of processor 22 and GPU 24 include, but are not limited to, a digital signal processor (DSP), general purpose microprocessor, application specific integrated circuit (ASIC), field programmable logic array (FPGA), or other equivalent integrated or discrete logic circuitry. In some examples, GPU 24 may be specialized hardware that includes integrated and/or discrete logic circuitry that provides GPU 24 with massive parallel processing capabilities suitable for graphics processing. In some instances, GPU 24 may also include general purpose processing, and may be referred to as a general purpose GPU (GPGPU) when implementing general purpose processing tasks (i.e., non-graphics related tasks).

Processor 22, sometimes referred to as a host, may be the central processing unit (CPU) of device 16. Processor 22 may execute various types of applications. Examples of the applications include web browsers, electronic readers, e-mail applications, spreadsheets, video games, video playback, audio playback, word processing, other applications that generate viewable objects for display, or any other types of applications. Global memory 20 may store instructions for execution of the one or more applications.

In some examples, processor 22 may offload processing tasks to GPU 24, such as tasks that require massive parallel operations. As one example, graphics processing requires massive parallel operations, and processor 22 may offload such graphics processing tasks to GPU 24. In some examples, processor 22 may offload tasks that are unrelated to graphics processing to GPU 24. For instance, data processing algorithms such as matrix operations, image processing, and video processing require parallel operations, and GPU 24 may be better suited to implement such operations as compared to processor 22.

To implement tasks, GPU 24 may be configured to execute one or more applications. For instance, for graphics related processing, GPU 24 may execute applications such as vertex shaders, fragment shaders, and geometry shaders. For non-graphics related processing, GPU 24 may execute applications designed for such processing (e.g., an application for implementing matrix operations or an application for fluid dynamics). For either example (e.g., graphics related processing or non-graphics related processing), processor 22 may instruct GPU 24 to execute the one or more applications, as described in more detail below.

Processor 22 may communicate with GPU 24 in accordance with a particular application processing interface (API). For example, processor 22 may transmit instructions to GPU 24 such as instructions that instruct GPU 24 to execute one or more applications utilizing the API. Examples of such APIs include the DirectX® API by Microsoft®, the OpenGL® by the Khronos group, and the OpenCL® by the Khronos group; however, aspects of this disclosure are not limited to the DirectX, the OpenGL, or the OpenCL APIs, and may be extended to other types of APIs that have been developed, are currently being developed, or are to be developed in the future. Moreover, the techniques described in this disclosure are not required to function in accordance with an API, and processor 22 and GPU 24 may utilize any technique for communication.

As one example, for graphics related applications, processor 22 may communicate with GPU 24 using the OpenGL API. For non-graphics related applications, processor 22 may communicate with GPU 24 using the OpenCL API. Again, the techniques described in this disclosure do not necessarily require processor 22 to communicate with GPU 24 using the OpenGL and/or OpenCL APIs.

The graphics related applications that GPU 24 is to execute may be referred to as shaders, and the non-graphics related applications that GPU 24 is to execute may be referred to as kernels. For example, global memory 20 may store the instructions of the shaders and kernels, and a compiler executing on processor 14 may convert the instructions of the shaders and kernels into object code for execution on GPU 16. As another example, global memory 20 may store the object code of the shaders and kernels that GPU 16 retrieves and executes.

As illustrated in FIG. 2, global memory 20 stores execution model 10 (FIG. 1). For example, global memory 20 may store the list of commands that define the pipeline topology of execution model 10. As described above, the developer may have defined the pipeline topology of execution model 10 to include kernels 14A-14C. Accordingly, global memory 20 may store the source code of kernels 14A-14C. Alternatively or in addition, global memory 20 may store precompiled source code of kernels 14A-14C (i.e., object code of kernels 14A-14C). It should be understood that if the developer defined an execution model to include more or fewer kernels or different kernels, then global memory 20 may store the source code and/or object code for those kernels. The ellipses between kernel 14A and 14C indicate that kernel 14B is also included in global memory 20.

In this example, processor 22 may retrieve the pipeline topology of execution model 10 from global memory 20. Based on the pipeline topology of execution model 10, processor 22 may determine that execution model 10 includes buffers 12A-12D. In this example, processor 22 may reserve storage locations in global memory 20 for buffers 12A-12D. For instance, part of execution model 10 may include characteristics of buffers 12A-12D such as the size of buffers 12A-12D. In this example, processor 22 may reserve storage locations in global memory 20 based on the characteristics of buffers 12A-12D. The ellipses between buffer 12A and 12D indicate that buffer 12B and 12C are also included in global memory 20.

As another example, part of the execution model 10 may include characteristics of kernels 14A-14C such as the amplification factor and/or the maximum amount of data that kernels 14A-14C produce. In this example, processor 22 may reserve storage locations in global memory 20 based on the characteristics of kernels 14A-14C. For instance, based on the amplification factor and/or the value indicative of the maximum amount of data that kernels 14A-14C produce, processor 22 may determine the appropriate sizes for buffers 12A-12D and reserve storage locations within global memory 20 based on the determined sizes.

It should be understood that although processor 22 is described as reserving storage locations within global memory 20 for buffers 12A-12D, aspects of this disclosure are not so limited. In some examples, IC 18 or GPU 24 may include a management unit (not shown in FIG. 2) that is configured to manage the buffers that are used by GPU 24 to implement the data processing algorithm defined by execution model 10. In these examples, processor 22 may instruct the management unit regarding the sizes of buffers 12A-12D, and the management unit may be configured to reserve storage locations within global memory for buffers 12A-12D.

This management unit may be configured to perform other functions such as cache-backing data stored in buffers 12A-12D and/or instructions of kernels 14A-14C within a cache of IC 18 or GPU 24. This management unit may also store information indicating the amount of data that is stored in each one of buffers 12A-12D. This management unit may be configured to manage data transfer between kernels 14A-14C when executing on GPU 24. For example, as illustrated in FIG. 1, the pipeline topology of execution model 10 indicates that kernel 14A outputs to buffer 12B, and kernel 14B receives data from buffer 12B. The management unit may be configured to manage the storage of data produced by kernel 14A in buffer 12B, and the retrieval of data from buffer 12B by kernel 14B, and in some examples, storage of the amount of data stored in buffer 12B. Techniques with respect to the management unit are also described in co-pending U.S. patent application Ser. No. 13/747,947, entitled "GRAPHICS PROCESSING UNIT BUFFER MANAGEMENT," filed Jan. 23, 2013, the contents of which are incorporated by reference in their entirety.

The utilization of the management unit is provided for example purposes and should not be considered limiting. For instance, the management unit is described as one example way in which a unit other than processor 22 reserves storage locations for buffer 12A-12D in global memory 20. However, aspects of this disclosure are not so limited, and processor 22, or even GPU 24, may be configured to perform such functions. For example, when GPU 24 stores data in buffers 12A-12D, GPU 24 may be configured to also store the amount of data that GPU 24 stored in buffers 12A-12D. For ease of description, the techniques are described with respect to processor 22 or GPU 24 performing such functions.

In accordance with the techniques described in this disclosure, processor 22 may receive an indication of the pipeline topology defined by execution model 10 (e.g., the command list of execution model 10, as one example). Processor 22 may generate instructions that define the manner in which GPU 24 is to implement the pipeline topology.

For example, as illustrated, processor 22 may execute compiler 28. Compiler 28 is shown in dashed lines to indicate that compiler 28 is not formed within processor 22. Rather, global memory 20 may store the object of compiler 28, which processor 22 retrieves and executes.

Compiler 28 may be configured to compile execution model 10 (e.g., the command list of execution model 10) to generate object code that GPU 24 is to execute, as well as instructions that define the manner in which GPU 24 is to implement execution model 10. As part of the compilation to generate instructions that define the manner in which GPU 24 is to implement execution model 10, compiler 28 may account for the processing capabilities of GPU 24.

For instance, as illustrated, global memory 20 may store GPU configuration 32. GPU configuration 32 may be configuration information defining or indicating the processing capabilities of GPU 24. As one example, GPU configuration 32 may indicate the number of programmable compute units within GPU 24. As described above, kernels execute on one or more programmable compute units within a GPU.

As another example, GPU configuration 32 may indicate the manner in which GPU 24 is capable of processing data in parallel. For instance, GPU 24 may be configured to implement a single program multiple data (SPMD) programming model or a single instruction multiple data (SIMD) programming model. As an example, if GPU 24 is configured for the SIMD programming model, GPU configuration 32 may include configuration information that indicates the number of lanes within GPU 24 for implementing the SIMD programming model (e.g., 8-lane SIMD).

GPU configuration 32 may include additional or different configuration information of GPU 24 than the information described above. In general, GPU configuration 32 may include any configuration information that describes the processing capabilities of GPU 24.

Furthermore, although GPU configuration 32 is illustrated as being stored in global memory 20, aspects of this disclosure are not so limited. In some examples, registers or cache within IC 18 may store GPU configuration 32. In some examples, registers or cache within GPU 24 may store GPU configuration 32. In both of these examples, processor 22 may read the information of GPU configuration 32 from the registers, rather than from global memory 20. In some examples, it may even be possible for processor 22 to be preconfigured with GPU configuration 32.

Compiler 28 may utilize the information of GPU configuration 32, as well as information of execution model 10, to compile execution model 10. The result of the compilation may be object code that GPU 24 is to execute, as well as instructions for the manner in which GPU 24 is to implement execution model 10. For example, in addition to the object code, the output of compiler 28 may be meta-scheduler instructions 34 that processor 22 stores in global memory 20. Meta-scheduler instructions 34 may be instructions for meta-scheduler 30, as described in more detail, that indicate the manner in which GPU 24 implements execution model 10.

For example, meta-scheduler instructions 34 may indicate that GPU 24 is to implement execution model 10 similar to a Kahn Processing Network (KPN). For instance, a KPN determines a channel that includes data, identifies a consumer for the channel, executes the consumer for some quantum of the data, and repeats these steps until all of the data is processed. The topology of execution model 10 may define kernels (analogous to the processes of the KPN) and buffers (analogous to channels of the KPN). In this manner, execution model 10 indicates the consumer kernel for each of the buffers. As described in more detail, in implementing execution model 10, GPU 24 may identify one of buffers 12A-12D that includes data, and may execute the consumer kernel (e.g., one of kernels 14A-14C) that is to consume the data of the identified one of buffers 12A-12D. It should be understood that the description of the KPN is provided merely for example reasons and to assist with understanding. The techniques described in this disclosure should not be considered limited to or identical to those of a KPN.

In accordance with the techniques, meta-scheduler instructions 34 may be a device-target binary. In other words, while execution model 10 may be platform-independent (i.e., not specific to GPU 24), meta-scheduler instructions 34 are platform-dependent (i.e., specific to GPU 24). For example, compiler 28 may utilize information from GPU configuration 32 to optimize the implementation of execution model 10 on GPU 24.

As one example, compiler 28 may utilize information such as the number of programmable compute units of GPU 24 to determine the time when kernels 14A-14C are to execute on the programmable compute units of GPU 24. For instance, as described above, pipeline implementation of the data processing algorithm defined by execution model 10 may include parallel execution (e.g., at the same time) of one or more of kernels 14A-14C or sequential execution (e.g., one after the other) of one or more of kernels 14A-14C. In this example, compiler 28 may generate meta-scheduler instructions 34 that indicate that kernels 14A-14C should execute sequentially if there are not many available programmable compute units or should execute in parallel if there are many available programmable compute units.

As another example, compiler 28 may utilize information from execution model 10 that indicates that some ones of kernels 14A-14C are more important than others. For example, assume that kernel 14B is more important than kernel 14C. In this example, compiler 28 may utilize information from GPU configuration 34 to generate meta-scheduler instructions 34 that ensure that kernel 14B executes uninterrupted even if it results in kernel 14C executing with some interruptions.

For instance, it may be possible for programmable compute units to switch from executing threads of one kernel to execute threads of another kernel, and then switch back. In this case, the kernel from which the programmable compute unit switched may be considered to be interrupted and in a paused state until the programmable compute unit switches back to execute the threads of the kernel. In some examples, compiler 28 may generate meta-scheduler instructions 34 that indicate that a programmable compute unit executing threads of an important kernel is not to switch to executing threads of another kernel.

As yet another example, compiler 28 may utilize information from GPU configuration 34 that indicates the number of data lanes within GPU 24. For example, assume that GPU configuration 34 indicates that GPU 24 is an eight lane SIMD GPU. In this example, compiler 28 may generate meta-scheduler instructions 34 that indicate that GPU 24 should not execute a consumer kernel until there are at least eight entries in the buffer coupled to the consumer kernel. For instance, as illustrated in FIG. 1, kernel 14B is a consumer kernel to kernel 14A, and receives data from buffer 12B. Assuming GPU 24 is an eight lane SIMD GPU, compiler 28 may generate meta-scheduler instructions 34 that indicate that GPU 24 should not execute kernel 14B until there are at least eight data items stored in buffer 12B.

As an additional example, compiler 28 may account for the size of buffers 12A-12D. For example, compiler 28 may utilize the information regarding the size of buffers 12A-12D to determine when kernels 14A-14C should execute such that the changes of deadlock are minimized. In this example, compiler 28 may generate meta-scheduler instructions 34 that indicate the order in which kernels 14A-14C execute so that deadlock does not occur.

In some examples, compiler 28 may be configured to determine whether there are any errors in implementing execution model 10 on GPU 24. For example, compiler 28 may be configured to determine whether there are any buffers 12A-12D that are part of execution model 10, but that are not coupled to any one of kernels 14A-14D. As another example, compiler 28 may be configured to determine whether any one of kernels 14A-14D attempt to access a non-existent buffer, or attempt to access an out-of-bounds storage location within a buffer. With compiler 28 validating the functionality of execution model 10 at compile time, compiler 28 may not need to include instructions in meta-scheduler instructions 34 that cause GPU 24 to validate the functionality of execution model 10.

After processor 22 generates meta-scheduler instructions 34, via compiler 28, processor 22 may instruct GPU 24 to retrieve meta-scheduler instructions 34 for execution. As illustrated, GPU 24 includes meta-scheduler 30. Meta-scheduler 30 may be hardware within GPU 24, firmware executing on hardware within GPU 24, or software executing on hardware within GPU 24. Meta-scheduler 30 may be configured to execute the instructions of meta-scheduler instructions 34.

In the techniques described in this disclosure, meta-scheduler 30 may be configured to determine which programmable compute units of GPU 24 should execute which threads of kernels 14A-14C and at what time. In other words, meta-scheduler 30 may be configured to schedule the execution of kernels 14A-14C on GPU 24 to cause GPU 24 to implement the data processing algorithm defined by the pipeline topology of execution model 10. In accordance with the techniques described in this disclosure, meta-scheduler 30 may determine the schedule of executing kernels 14A-14C on GPU 24 based on meta-scheduler instructions 34.

For example, meta-scheduler instructions 34 may indicate that one or more of kernels 14A-14C are to be executed in parallel or sequentially. In this example, meta-scheduler 30 may determine which programmable compute units should execute threads of kernels 14A-14C to achieve parallel or sequential execution. As another example, meta-scheduler instructions 34 may indicate the importance of kernels 14A-14C. In this example, meta-scheduler 30 may determine which programmable compute units should execute threads of kernels 14A-14C such that programmable compute units that execute important kernels are not interrupted while executing the kernels. As another example, meta-scheduler instructions 34 may indicate when one of kernels 14A-14C is to execute based on the SIMD or SPMD capabilities of GPU 24. In this example, meta-scheduler 30 may determine which programmable compute units execute threads, at what time, based on the instructions of meta-scheduler instructions 34. Meta-scheduler 30 may also utilize instructions in meta-scheduler instructions 34 that indicate the timing of when kernels 14A-14C should execute to avoid deadlock.

To reiterate, compiler 28 may have taken into account the computing capabilities of GPU 24, based on the information in GPU configuration 32, in generating meta-scheduler instructions 34. Accordingly, the techniques described in this disclosure provide some level of assurance that meta-scheduler 30 will be able to properly allocate programmable compute units to execute kernels 14A-14C in the manner indicated by meta-scheduler 34. For example, as described above, compiler 28 may account for factors such as number of programmable compute units within GPU 24, size of buffers 12A-12D, SIMD or SPMD capabilities of GPU 24, or importance of kernels 14A-14C, as a few illustrative examples, to generate meta-scheduler instructions 34. When meta-scheduler 30 of GPU 24 utilizes meta-scheduler instructions 34 to determine how kernels 14A-14C are to be executed, there may be some guarantee that kernels 14A-14C will execute efficiently on GPU 24.

In this way, processor 22 may receive an indication of a pipeline topology of execution model 10, where execution model 10 is defined in a platform-independent manner. Processor 22 may execute compiler 28, which accounts for the processing capabilities of GPU 24 to generate meta-scheduler instructions 34 that define, in a platform-specific manner, how the pipeline topology of execution model 10 is to be implemented on GPU 24. Meta-scheduler 30 of GPU 24 may receive meta-scheduler instructions 34 and determine which programmable compute units should execute threads of kernels 14A-14C, and at what time, based on the instructions of meta-scheduler instructions 34.

Because meta-scheduler instructions 34 are platform-specific, meta-scheduler instructions 34 may define the manner in which kernels 14A-14C are to be executed that results in the optimal implementation of the pipeline topology of execution model 10 on GPU 24. For instance, if meta-scheduler instructions 34 were used by a different type of GPU than GPU 24, this different type of GPU may not efficiently implement the pipeline topology of execution model 10 because meta-scheduler instructions 34 are specific to the platform of GPU 24.

In some examples, meta-scheduler 30 may be configured to implement an execution policy. For example, it may not be necessary in every example for compiler 28 to define exactly when kernels 14A-14C are to execute. Rather, meta-scheduler instructions 34, which compiler 28 generates, may indicate that kernels 14A-14C are to execute on GPU 24 and may indicate which kernels 14A-14C are producer kernels and which are consumer kernels.

In these examples, meta-scheduler 30 may be configured to implement an execution policy that indicates when kernels 14A-14C are to execute. One example of the execution policy is that meta-scheduler 30 determines which ones of buffers 12A-12D store data, and executes one or more of kernels 14A-14C that receive data from buffers 12A-12D that store data. For instance, meta-scheduler 30 may inspect buffers 12A-12D in a round-robin fashion, and may execute all kernels that consume data from buffers 12A-12D that store data.

As another example of the execution policy, meta-scheduler 30 may determine which buffers 12A-12D store data based on the importance of kernels 14A-14C. The importance of kernels 14A-14C may be defined by the priority of kernels 14A-14C. Meta-scheduler 30 may first inspect the buffer of buffers 12A-12D from which the kernel with the highest priority of kernels 14A-14D receives data. If that buffer is storing data, meta-scheduler 30 may execute the kernel with the highest priority. Next, meta-scheduler 30 may inspect the buffer of buffers 12A-12D from which the kernel with the next highest priority of kernels 14A-14D receives data. If that buffer is storing data, meta-scheduler 30 may execute the kernel with the next highest priority, and so forth.

As yet another example of the execution policy, meta-scheduler 30 may determine which one of buffers 12A-12D stores the most amount of data. Meta-scheduler 30 may execute the kernel of kernels 14A-14C that receives data from the buffer of buffers 12A-12D that stores the most amount of data. As one example, when GPU 24 writes data to one of buffers 12A-12D, GPU 24 may store information indicating the amount of data that is stored in the one of buffers 12A-12D to which GPU 24 wrote the data. In these examples, meta-scheduler 30 may be configured to determine which one of buffers 12A-12D stores the most amount of data based on information that GPU 24 stores indicating the amount of data within buffers 12A-12D.

However, it is not necessary for meta-scheduler 30 to be preconfigured to implement an execution policy. Rather, it may be possible for compiler 28 to determine the execution policy of meta-scheduler 30 as part of the instructions of meta-scheduler instructions 34 generated by compiler 28.

Moreover, it may be possible for the developer to define the execution policy of meta-scheduler 30. For example, the developer may define the execution policy of meta-scheduler 30 as part of execution model 10, and compiler 28 may utilize this developer-defined execution policy to generate instructions of meta-scheduler instructions 34 that instruct meta-scheduler 30 as to the developer defined execution policy.

However, it may be more suitable for the developer to not define the execution policy. For example, if the developer were to define the execution policy, the execution policy may not function well in a platform-independent manner. It may be difficult for the developer to develop an execution policy that functions well for all GPU types, and produces the same functional results in a deterministic application (e.g., the same results across different GPU types for the same application).

In general, the developer may not be specifically interested in the execution policy so long as kernels 14A-14C execute properly to implement the data processing algorithm defined by execution model 10. Accordingly, it may not be of concern if the developer cannot define the execution policy, and for compiler 28 to determine the execution policy.

In the examples described above, compiler 28 compiled execution model 10 to generate object code to be executed on GPU 24 and to generate meta-scheduler instructions 34. In some examples, compiler 28 may store the object code to be executed on GPU 24 in global memory 20. In examples where execution model 10 is one execution model of a plurality of execution models, compiler 28 may not need to recompile execution model 10. In other words, it may be possible to create large data processing algorithms by combining a plurality of execution models, and in some examples, by combining the object code of the execution models stored in global memory 20. For example, the data processing algorithm may be created from the object code of execution models stored in global memory 20. Such creation of the data processing algorithm may be useful for examples where GPU 24 is an FPGA or an embedded device.

In the techniques described in this disclosure, in addition to instructing GPU 24 to retrieve meta-scheduler instructions 34 for meta-scheduler 30, processor 22 may provide GPU 24 with any additional information needed for GPU 24 to execute kernels 14A-14C. For example, kernels 14A-14C, in addition to the data from buffers 12A-12D, may require addition information (such as arguments) to function. Processor 22 may provide such additional information to GPU 24.

Processor 22 may then instruct GPU 24 to implement execution model 10. GPU 24 may then implement execution model 10 based on the instructions of meta-scheduler instructions 34 and the object code that processor 22 generated as part of the compilation process by compiler 28. In some examples, GPU 24 may be able to implement execution model 10 without any synchronization with processor 22. For example, processor 22 may initiate the implementation of execution model 10, and GPU 24 may implement execution model 10 without any synchronization with processor 22.

Moreover, in some examples, it may be possible to configure compiler 28 and meta-scheduler 30 in a debug mode. For example, after the developer develops execution model 10, the developer may desire to test the implementation of execution model on a GPU prior to release. For testing, the developer may load execution model 10 on a device such as device 16, and test execution model 10 on GPU 24. As part of the testing, the developer may utilize a debug mode. In the debug mode, compiler 28 may generate meta-scheduler instructions 34 that reduce the range of storage locations of buffers 12A-12D to a single storage location (e.g., reduce NDrange sizes to a minimum). Meta-scheduler instructions 34 may also indicate that only one kernel of kernels 14A-14C is to execute at one time.

In the debug mode, the developer may be able to trace the way in which data is stored in buffers 12A-12D, as well as the way in which each one of kernels 14A-14C is being executed on GPU 24. This may allow the developer to address any problems in kernels 14A-14C or any problems in execution model 10.

As described above, compiler 28 may generate meta-scheduler instructions 34. The following is example pseudo-code of meta-scheduler instructions 34 for execution model 10. In some examples, it may be beneficial for compiler 28 to generate meta-scheduler instructions 34, rather than giving the developer the ability to generate meta-scheduler instructions 34. For example, if the developer were to generate meta-scheduler instructions 34, execution model 10 may not be portable and may lead to confusion and hard-to-debug user errors.

In the following pseudo-code, F1 refers to buffer 12A, F2 refers to buffer 12B, F3 refers to buffer 12C, and F4 refers to buffer 12D. K1 refers to kernel 14A, K2 refers to kernel 14B, and K3 refers to kernel 14C.

```
while (true)
{
    //Node 1
    if (K1.F1.size( ) > 0)
    {
        maxSafeNdRangeSizeK1 = min(K1.F1.size( ),
            ((K1.F3.maxSize( ) − K1.F3.size( ))/K1.F3.ampFactor( )),
            ((K1.F2.maxSize( ) − K1.F2.size ( ))/K1.F2.ampFactor( )));
        enqueue (K1, maxSafeNdRangeSizeK1);
    }
    //Node 2
    ...
    //Node 3
    ...
    If (F1.size( ) + F2.size( ) + F3.size( ) + F4.size ( ) == 0)
        && (K3 is done))
    {
        Exit //Finished execution of graph
    }
}
```

Figure 3:
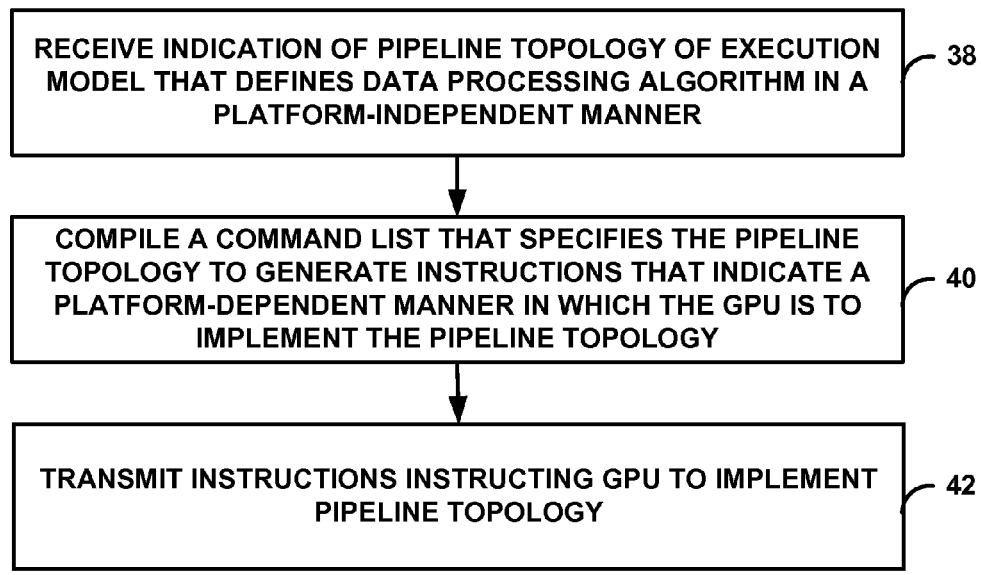
FIG. 3 is a flowchart illustrating an example technique in accordance with one or more examples described in this disclosure.

FIG. 3 is a flowchart illustrating an example technique in accordance with one or more examples described in this disclosure. For instance, FIG. 3 illustrates techniques for heterogeneous computing (e.g., computing in a platform-independent manner). For ease of illustration, reference is made to FIG. 2.

As illustrated in FIG. 3, processor 22 may receive an indication of a pipeline topology of execution model 10 that defines a data processing algorithm in a platform-independent manner (38). For example, the indication of the pipeline topology of execution model 10 may be a command list created by the developer of execution model 10. The platform-independent definition of the data processing algorithm means that execution model 10 is not designed based on a specific platform of a GPU (e.g., independent upon the type of GPU that is to implement the data processing algorithm).

Compiler 28 of processor 22 may compile the command list that specifies the pipeline topology to generate meta-scheduler instructions 34 (40). Meta-scheduler instructions 34 may indicate a platform-dependent manner in which GPU 24 is to implement the pipeline topology of execution model 10. The platform-dependent manner in which GPU 24 is to implement the pipeline topology means that meta-scheduler instructions are based on the specific platform of GPU 24 as indicated by GPU configuration 32 (e.g., based on the GPU type of GPU 24). Processor 22 may transmit instructions to instruct GPU 24 to implement the pipeline topology of execution model 10 (42).

There may be various ways in which processor 22, via compiler 28, may generate meta-scheduler instructions 34. As one example, compiler 28 may compile the command list based at least on configuration information of GPU 24 to generate the instructions that define the platform-dependent manner in which the pipeline topology of execution model 10 is to be implemented on GPU 24. GPU configuration 32 may provide the configuration information of GPU 24. For example, the configuration information may include a number of programmable compute units within GPU 24. The configuration information may include a number of data lanes in GPU 24 (i.e., the SIMD or SPMD capabilities of GPU 24).

In some examples, compiler 28 may compile the command list based on information provided in execution model 10. For example, compiler 28 may compile the command list based on a size of buffers identified in the pipeline topology of execution model 10 (e.g., buffers 12A-12D) to generate meta-scheduler instructions 34. As another example, compiler 28 may compile the command list based on an importance of kernels identified in the pipeline topology of execution model 10 (e.g., kernels 14A-14C) to generate meta-scheduler instructions 34.

It should be understood that compiler 28 utilizing factors such as number of programmable compute units in GPU 24, the number of data lanes in GPU 24, the size of buffers 12A-12D, and the importance of kernels 14A-14C, are provided for purposes of illustration, and should not be considered limiting. Moreover, compiler 28 may utilize any of factors alone or in any combination. For example, it is not necessary for compiler 28 to utilize only one of these factors in generating meta-scheduler instructions 34. Rather, compiler 28 may utilize one of these factors, one or more of these factors, and any combination of these factors to generate meta-scheduler instructions 34.

Figure 4:
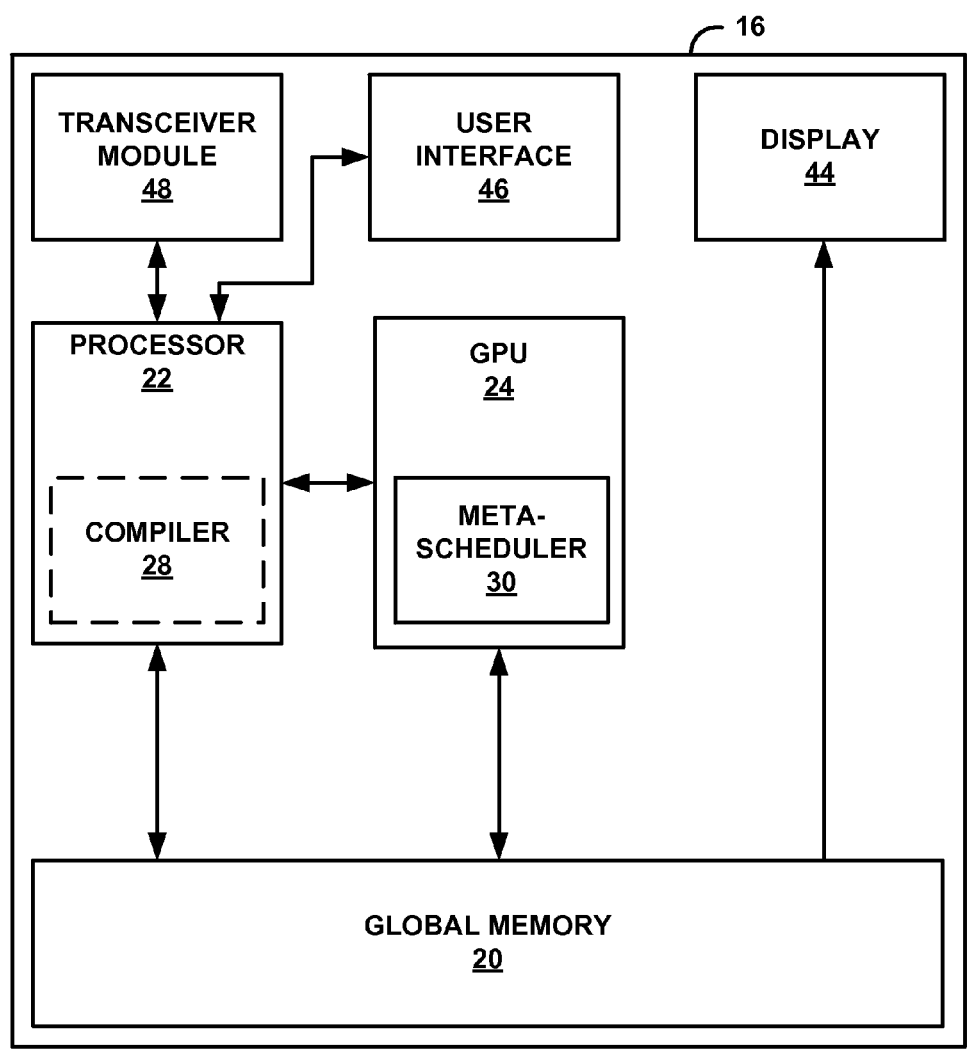
FIG. 4 is a block diagram illustrating a device of FIG. 2 in further detail.

FIG. 4 is a block diagram illustrating a device of FIG. 2 in further detail. For example, FIG. 4 further illustrates device 16. Examples of device 16 include, but are not limited to, wireless devices, mobile telephones, personal digital assistants (PDAs), video gaming consoles that include video displays, mobile video conferencing units, laptop computers, desktop computers, television set-top boxes, tablet computing devices, e-book readers, and the like. Device 16 may include processor 22, GPU 24, global memory 20, display 44, user interface 46, and transceiver module 48. Processor 22 and GPU 24 may be housed within a common IC 18, or may be housed separately, as illustrated in FIG. 4. Moreover, as illustrated, processor 22 may execute compiler 28 to generate meta-scheduler instructions 34, and GPU 24 includes meta-scheduler 30 configured to implement the instructions of meta-scheduler instructions 34.

Device 16 may include additional modules or units not shown in FIG. 4 for purposes of clarity. For example, device 16 may include a speaker and a microphone, neither of which are shown in FIG. 4, to effectuate telephonic communications in examples where device 16 is a mobile wireless telephone. Furthermore, the various modules and units shown in device 16 may not be necessary in every example of device 16. For example, user interface 46 and display 44 may be external to device 16 in examples where device 16 is a desktop computer. As another example, user interface 46 may be part of display 44 in examples where display 44 is a touch-sensitive or presence-sensitive display of a mobile device.

Global memory 20, processor 22, GPU 24, compiler 28, and meta-scheduler 30 may be similar to global memory 20, processor 22, GPU 24, compiler 28, and meta-scheduler 30 and are not described further with respect to FIG. 4. Examples of user interface 46 include, but are not limited to, a trackball, a mouse, a keyboard, and other types of input devices. User interface 46 may also be a touch screen and may be incorporated as a part of display 44. Transceiver module 48 may include circuitry to allow wireless or wired communication between device 16 and another device or a network. Transceiver module 48 may include modulators, demodulators, amplifiers and other such circuitry for wired or wireless communication. Display 44 may comprise a liquid crystal display (LCD), a cathode ray tube (CRT) display, a plasma display, a touch-sensitive display, a presence-sensitive display, or another type of display device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for heterogeneous computing, the method comprising:
   receiving, with a processor, a pipeline topology of an execution model that defines a data processing algorithm in a platform-independent manner;
   generating, with the processor, instructions that indicate a platform-dependent manner in which the pipeline topology of the execution model is to be implemented on a graphics processing unit (GPU), wherein the platform-dependent manner in which the pipeline topology of the execution model is to be implemented on the GPU is based on a platform of the GPU, wherein the pipeline topology identifies producer kernels that produce data that is to be consumed by consumer kernels, wherein the instructions are based on an amplification factor, and wherein a maximum amount of data that is to be produced by the producer kernels is based on the amplification factor and an amount of data that the producer kernels will receive; and
   transmitting, with the processor, the instructions to the GPU.

2. The method of claim 1, wherein generating instructions comprises:
   compiling a command list that specifies the pipeline topology of the execution model to generate the instructions.

3. The method of claim 2, wherein compiling the command list comprises:
   compiling the command list based at least on configuration information of the GPU to generate the instructions that define the platform-dependent manner in which the pipeline topology of the execution model is to be implemented on the GPU.

4. The method of claim 3, wherein the configuration information of the GPU comprises one or more of:
   a number of programmable compute units within the GPU; and
   a number of data lanes in the GPU.

5. The method of claim 2, wherein compiling the command list comprises:
   compiling the command list based at least on one or more of:
   a size of buffers identified in the pipeline topology of the execution model; and
   an importance of kernels identified in the pipeline topology of the execution model.

6. The method of claim 1, wherein receiving the pipeline topology comprises:
   receiving a command list that indicates one or more kernels and one or more buffers interconnected to form the pipeline topology.

7. An apparatus comprising:
   a graphics processing unit (GPU); and
   a processor configured to:
      receive an indication of a pipeline topology of an execution model that defines a data processing algorithm in a platform-independent manner;
      generate instructions that indicate a platform-dependent manner in which the pipeline topology of the execution model is to be implemented on the GPU, wherein the platform-dependent manner in which the pipeline topology of the execution model is to be implemented on the GPU is based on a platform of the GPU, wherein the pipeline topology identifies producer kernels that produce data that is to be consumed by consumer kernels, wherein the instructions are based on an amplification factor, wherein a maximum amount of data that is to be produced by the producer kernels is based on the amplification factor and an amount of data that the producer kernels will receive; and
      transmit the instructions to the GPU.

8. The apparatus of claim 7, wherein, to generate the instructions, the processor is configured to:
   compile a command list that specifies the pipeline topology of the execution model.

9. The apparatus of claim 8, wherein, to compile the command list, the processor is configured to:
   compile the command list based at least on configuration information of the GPU to generate the instructions that define the platform-dependent manner in which the pipeline topology of the execution model is to be implemented on the GPU.

10. The apparatus of claim 9, wherein the configuration information of the GPU comprises one or more of:
    a number of programmable compute units within the GPU; and
    a number of data lanes in the GPU.

11. The apparatus of claim 8, wherein, to compile the command list, the processor is configured to:
    compile the command list based at least on one or more of:
    a size of buffers identified in the pipeline topology of the execution model; and
    an importance of kernels identified in the pipeline topology of the execution model.

12. The apparatus of claim 7, wherein, to receive the pipeline topology, the processor is configured to:
    receive a command list that indicates one or more kernels and one or more buffers interconnected to form the pipeline topology.

13. The apparatus of claim 7, wherein the apparatus comprises one of:
    a media player;
    a set-top box;
    a wireless handset;
    a desktop computer;
    a laptop computer;
    a gaming console;
    a video conferencing unit; and
    a tablet computing device.

14. A non-transitory computer-readable storage medium having instructions stored thereon that when executed by one or more processors cause the one or more processors to:
    receive a pipeline topology of an execution model that defines a data processing algorithm in a platform-independent manner;
    generate instructions that indicate a platform-dependent manner in which the pipeline topology of the execution model is to be implemented on a graphics processing unit (GPU), wherein the platform-dependent manner in which the pipeline topology of the execution model is to be implemented on the GPU is based on a platform of the GPU, wherein the pipeline topology identifies producer kernels that produce data that is to be consumed by consumer kernels, and wherein the instructions are based on an amplification factor, and wherein a maximum amount of data that is to be produced by the producer kernels is based on the amplification factor and an amount of data that the producer kernels will receive; and
    transmit the instructions to the GPU.

15. The non-transitory computer-readable storage medium of claim 14, wherein the instructions that cause the one or more processors to generate instructions comprise:
   instructions that cause the one or more processors to compile a command list that specifies the pipeline topology of the execution model to generate the instructions.

16. The non-transitory computer-readable storage medium of claim 15, wherein the instructions that cause the one or more processors to compile the command list comprise:
   instructions that cause the one or more processors to compile the command list based at least on configuration information of the GPU to generate the instructions that define the platform-dependent manner in which the pipeline topology of the execution model is to be implemented on the GPU.

17. The non-transitory computer-readable storage medium of claim 16, wherein the configuration information of the GPU comprises one or more of:
   a number of programmable compute units within the GPU; and
   a number of data lanes in the GPU.

18. The non-transitory computer-readable storage medium of claim 15, wherein the instructions that cause the one or more processors to compile the command list comprise:
   instructions that cause the one or more processors to compile the command list based at least on one or more of:
   a size of buffers identified in the pipeline topology of the execution model; and
   an importance of kernels identified in the pipeline topology of the execution model.

19. An apparatus comprising:
a graphics processing unit (GPU); and
a processor comprising:
   means for receiving a pipeline topology of an execution model that defines a data processing algorithm in a platform-independent manner;
   means for generating instructions that indicate a platform-dependent manner in which the pipeline topology of the execution model is to be implemented on the GPU, wherein the platform-dependent manner in which the pipeline topology of the execution model is to be implemented on the GPU is based on a platform of the GPU, wherein the pipeline topology identifies producer kernels that produce data that is to be consumed by consumer kernels, wherein the instructions are based on an amplification factor, and wherein a maximum amount of data that is to be produced by the producer kernels is based on the amplification factor and an amount of data that the producer kernels will receive; and
   means for transmitting the instructions to the GPU.

20. The apparatus of claim 19, wherein the means for generating instructions comprises:
   means for compiling a command list that specifies the pipeline topology of the execution model to generate the instructions.

* * * * *